US000001186H

United States Statutory Invention Registration [19]

[11] Reg. Number: H1186

[43] Published: May 4, 1993

Gelles

[54] SELF-ADHESIVE WATER PROOFING PRODUCT

[76] Inventor: Richard Gelles, 201 Wilcrest, Apt. 804, Houston, Tex. 77042

[21] Appl. No.: 674,268

[22] Filed: Mar. 25, 1991

[51] Int. Cl.[5] ..... B32B 7/12; B32B 15/04

[52] U.S. Cl. ..... 428/355

[58] Field of Search ..... 524/68; 428/355, 356, 428/489

[56] References Cited

U.S. PATENT DOCUMENTS

| | | | |
|---|---|---|---|
| 4,011,184 | 3/1977 | van Reijendam et al. | 260/28.5 R |
| 4,196,115 | 4/1980 | Bresson | 524/68 |
| 4,330,449 | 5/1982 | Maldonado et al. | 525/68 |
| 4,464,427 | 8/1984 | Barlow | 524/68 X |
| 4,529,755 | 7/1985 | Nishikawa et al. | 523/436 |
| 4,576,648 | 3/1986 | Demangeon et al. | 106/269 |
| 4,578,429 | 3/1986 | Gergen et al. | 525/291 |
| 4,581,293 | 4/1986 | Saunders | 428/413 |
| 4,595,636 | 6/1986 | Wiercinski et al. | 524/68 X |
| 4,650,834 | 3/1987 | Yagishita et al. | 525/386 |
| 4,749,434 | 6/1988 | Harrison | 156/306.9 |
| 4,749,622 | 6/1988 | Vonk et al. | 428/36.8 X |
| 4,835,199 | 5/1989 | Futamura et al. | 524/68 X |
| 4,868,245 | 9/1989 | Pottick et al. | 525/98 |
| 4,876,130 | 10/1989 | Vonk et al. | 524/68 X |
| 4,882,373 | 11/1989 | Moran | 524/68 |
| 4,904,713 | 2/1990 | Vonk et al. | 524/68 |
| 4,973,615 | 11/1990 | Futamura et al. | 524/68 X |
| 4,994,508 | 2/1991 | Shiraki et al. | 524/68 X |
| 5,036,119 | 7/1991 | Berggren | 524/68 X |
| 5,051,451 | 9/1991 | Gelles | 524/68 |

FOREIGN PATENT DOCUMENTS

| | | |
|---|---|---|
| 37136 | 3/1981 | European Pat. Off. . |
| 216679 | 8/1986 | European Pat. Off. . |
| 234615 | 1/1987 | European Pat. Off. . |
| 238149 | 3/1987 | European Pat. Off. . |
| 299820 | 6/1988 | European Pat. Off. . |
| 0299499 | 7/1988 | European Pat. Off. . |
| 360656 | 8/1989 | European Pat. Off. . |
| 359521 | 12/1989 | European Pat. Off. . |
| 2225173 | 11/1972 | Fed. Rep. of Germany . |
| 56-115354 | 4/1981 | Japan . |
| 58-40349 | 2/1983 | Japan . |
| 62-61615 | 7/1987 | Japan . |
| 2008125 | 11/1978 | United Kingdom . |

*Primary Examiner*—Robert L. Stoll
*Assistant Examiner*—Joseph D. Anthony

[57] ABSTRACT

A self-adhesive water proofing product which comprises:

(a) a water proofing layer, and (b) an adhesive layer comprising a mixture of a bituminous component and a block copolymer comprised of at least one vinyl aromatic hydrocarbon and at least one conjugated diene wherein the block copolymer contains at least one functional group provided by an acid or anhydride group or a derivative thereof.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF-ADHESIVE WATER PROOFING PRODUCT

BACKGROUND OF THE INVENTION

The present invention relates to a self-adhesive water proofing product which utilizes an adhesive layer comprising a bituminous component and a functionalized block copolymer component.

European Patent Application 0,238,149, published Sep. 23, 1987, discloses a bituminous composition which is useful as a self-adhesive compound. The composition comprises a bituminous component, a lithium salt of a $C_{10-40}$ fatty acid or hydroxy fatty acid, an elastomer and an amorphous silica filler. This bituminous composition is described as being useful as a preformed self-adhesive layer on a protective sheet, such as roofing felt.

Prior systems, such as disclosed in European Patent Application 37,136, utilized compositions containing harder asphalts and thus were not sufficiently tacky for use in a self-adhesive product. When tackier asphalts were used, the formulation would generally exude oil which would often cause the product to lose adhesion to the substrate to which it was adhered. This phenomenon can be demonstrated in a laboratory flow resistance test at elevated temperatures. European Application 0,238,149 added the silica filler to the formation to prevent this phenomenon from taking place. However, this composition including silica has a disadvantage in that the use of too much silica can cause a loss of tack of the composition, thereby negating its usefulness as a preformed self-adhesive layer.

Therefore, it would be an advantage to provide a water proofing product which utilizes a bituminous self-adhesive layer which does not require the use of large amounts of silica to prevent oil from exuding from the bituminous composition (small amounts of silica may be advantageous herein). The present invention provides such a product.

SUMMARY OF THE INVENTION

The present invention is a self-adhesive water proofing product which comprises a water proofing layer and an adhesive layer comprising a bituminous component and a block copolymer comprised of at least one vinyl aromatic hydrocarbon and at least one conjugated diene wherein the copolymer is functionalized by grafting at least one acid or anhydride group or a derivative thereof onto a conjugated diene block. It is preferred that the adhesive layer comprise a mixture of bituminous component and polymer which comprises from about 85% to about 99.5% of the bituminous component and from about 0.5% to about 15% of the functionalized block copolymer.

DETAILED DESCRIPTION OF THE INVENTION

The self-adhesive water proofing products of the present invention include polymer modified asphalt roll roofing products, shingles, building foundation liners, storage tank liners, thermoplastic and thermoset rubber sheet roofing (often called single ply roofing), roofing felt, etc. The inventive systems basically require a protective membrane which contains a layer of a protective water proofing material and an adhesive layer described below. The protective material includes rubber sheets, metal foils, such as aluminum foils, heat or sound insulation panels, roofing felt, and polymer modified asphalt. Polymers included in the latter are block copolymers, polyolefins like atactic polypropylene, polyethylene, elastomers like EPDM and SBR and the like. For roll roofing membranes, one example of the protective layer is a reinforcing mat saturated and coated with polymer modified asphalt or other bitumen and then topped with granules. It is preferred that the protective layer is a reinforcing fibrous mat saturated and coated with block copolymer modified asphalt and topped with granules.

Another water proofing product which can be made according to the present invention is a self-adhesive building foundation liner which comprises a water proofing protective layer comprised of a polymer modified bitumen sheet which may include a reinforcing fibrous mat and also may include a plastic coating. Another product which can be made according to the present invention is a self-adhesive storage tank liner which comprises a water proofing layer of a polymer modified bitumen sheet which may include a reinforcing fibrous mat. Also encompassed is a rubber sheet roofing product which comprises a water proofing layer utilizing a thermoplastic or thermoset neat or compounded rubber sheet. Still another product is a self adhesive roofing felt product which comprises a waterproofing layer of a reinforcing fibrous mat saturated and coated with bitumen. All of these products include an adhesive layer comprising a mixture of a bituminous component and a block copolymer comprised of at least one vinyl aromatic hydrocarbon and at least one conjugated diene wherein the block copolymer contains at least one functional group as described below.

The bituminous component in the bituminous-block copolymer compositions according to the present invention may be a naturally occurring bitumen or derived from a mineral oil. Also, petroleum derivatives obtained by a cracking process and coal tar can be used as the bituminous component as well as blends of various bituminous materials.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

The adhesive layer in the product of the present invention comprises a mixture of bituminous component and polymer comprising generally from about 85% to about 99.5% of the bituminous component and from about 0.5% to about 15% of the functionalized block copolymer. If less than 0.5% of the functionalized block copolymer is used, then the adhesive layer in the product does not exhibit improved adhesion over prior systems and if more than 15% of the block polymer is used, then the product becomes too costly. Preferably, from about 1% to about 12% of the functionalized block copolymer is used because this range ensures that the improvement over prior systems is obtained while maintaining reasonable cost.

The functionalized block copolymers utilized should contain from at least about 0.2% of the functional groups because this ensures the desired improvement is obtained. Preferably, from about 0.5% to about 3% of the functional groups should be present in the polymer.

The base polymers of the present invention are block copolymers of conjugated dienes and vinyl aromatic hydrocarbons. Such block copolymers may be multiblock copolymers of varying structures containing various ratios of conjugated dienes to vinyl aromatic hydrocarbons including those containing up to about 50% by weight of vinyl aromatic hydrocarbon. Thus, multiblock copolymers may be utilized which are linear or radial, symmetric or asymmetric, and which have structures represented by the formulae, A-B, A-B-A, A-B-A-B, B-A, B-A-B, B-A-B-A, $(A-B)_{0,1,2}$. . . B-A and the like wherein A is a polymer block of a vinyl aromatic hydrocarbon and B is a polymer block of a conjugated diene. It is not necessary but B can be a polymer block of a conjugated diene that has been hydrogenated.

The block copolymers may be produced by any well known block polymerization or copolymerization procedures including the well-known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 1,3-dimethylstyrene, alpha-methylstyrene, vinylnapthalene, vinylanthracene and the like. The preferred vinyl aromatic hydrocarbon is styrene.

The present invention works with both unhydrogenated and hydrogenated block copolymers. Hydrogenated ones are useful in certain circumstances. While block copolymers have a number of outstanding technical advantages, one of their principle limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

In general, any materials having the ability to react with the base polymer are operable for purposes of the present invention to make the functionalized block copolymers used herein. One method to incorporate the functional groups into the base polymer is to graft manomers capable of reacting with the base polymer in solution or in the melt by free radical mechanisms. There are many other possible ways to incorporate functional groups into the block copolymer. Examples include metallation as described in U.S. Pat. No. 4,868,245 and sulfonation as described in U.S. Pat. No. 4,086,171 herein incorproated by reference. The method chosen to incorporate the functional groups is not critical to the invention.

The functionalized block copolymers of the present invention are bydrogenated and unhydrogenated block copolymers as described above which have been functionalized, i.e. reacted with various functional group-containing molecules. The functional group containing molecules which may be reacted with such block copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent.

Unfunctionalized block copolymers have been used in similar applications before. The products of the present invention which utilize functionalized block copolymers are much better than such prior products because products which utilize the functionalized block copolymers exhibit higher bond strengths to substrates. Also, these functionalized block copolymers are more compatible with some bitumens which contain more polar components. Another advantage is that once it is adhered to a substrate the bituminous composition containing such functionalized block copolymers does not exude oil and debond from the substrate as do most of the asphalt polymer systems which are formulated to be soft and tacky. Thus, the problem of exuding of oil can be avoided without the use of large amounts of silica as described in European Patent Application 0,238,149.

EXAMPLE

This example proves that fluxes and asphalts modified with maleic anhydride functionalized block copolymers of vinyl aromatic hydrocarbons and conjugated dienes exhibit improved adhesion to polar substrates compared to unmodified systems and systems modified with such polymers which do not contain functionality. Asphalts and polymer modified asphalts are often used in applications in which adhesion to polar materials is required. An example is "peel 'n stick" (aggressively tacky) membranes. In the current work, I screened KRATON® FG-1901X Rubber (a maleic anhydride functionalized low molecular weight hydrogenated styrene-butadiene-styrene SEBS block copolymer grafted with approximately 1.7% maleic anhydride) modified fluxes and asphalts in "peel 'n stick" performance.

Polymer modified asphalts and fluxes were prepared at 180° C. with high shear mixing. They were then doctor bladed to a 50 mil thick film on a mylar backing. The film was allowed to cool to room temperature. It was then adhered to the test substrate at room temperature with a 26 pound roller. 180 degree peel tests were run on the specimens at room temperature with an Instron using a jaw separation rate of 2'/min. Results are given in Table 1.

Results for samples 6 (compared to 1-5) and 11 (compared to 9 and 10) show that fluxes and asphalts modified with FG-1901X exhibit significantly higher peel strengths to steel than unmodified systems and systems modified with rubbers which do not contain functional groups. Results for samples 7 and 8 show that FG-1901X also provides improved adhesion to aluminum and portland cement concrete as compared to an unmodified rubber.

TABLE 1

180 Degree Peel Strengths

| Sample | Flux or Asphalt[1] | Polymer | Substrate | Peel Strength (pli)[2] |
|---|---|---|---|---|
| 1 | Flux | None | Steel | 0.02 ± 0.03 |
| 2 | Flux | 12% D1101[4] | Steel | 0.4 ± 0.3 |
| 3 | Flux | 12% D1184[5] | Steel | 0.3 ± 0.3 |
| 4 | Flux | 6% D1184 + 6% D1118[6] | Steel | 0.7 ± 0.3 |
| 5 | Flux | 12% Degraded G1652[3] | Steel | 0.7 ± 0.3 |
| 6 | Flux | 12% FG1901X[7] | Steel | 2.8 ± 0.9 |
| 7 | Flux | 6% FG1901X + 6% D1101 | Steel | 3.9 ± 3.6 |
| 8 | Flux | 6% FG1901X + 6% D1184 | Steel | 3.4 ± 0.9 |
| 9 | WR AC-10 | None | Steel | 1.0 ± 0.4 |
| 10 | WR AC-10 | 12% Degraded G1652 | Steel | 1.7 ± 0.9 |
| 11 | WR AC-10 | 12% FG1901X | Steel | 10.6 ± 2.4 |
| 12 | Flux | 12% G1652 | Aluminum | 0.8 ± 0.3 |
| 13 | Flux | 12% FG1901X | Aluminum | 2.3 ± 0.3 |
| 14 | Flux | 12% G1652 | Portland Cement | 2.1 ± 1.5 |
| 15 | Flux | 12% FG1901X | Portland Cement | 5.8 ± 2.7 |

TABLE 1-continued

180 Degree Peel Strengths

[1]Deer Park flux and Woodriver AC-10 used.
[2]Average of 5 values ± 3 standard deviations. Neat asphalts failed cohesively. Modifieds failed adhesively.
[3]KRATON ® G1652 polymer (a linear SEBS polymer) degraded to the same level as FG1901X.
[4]KRATON ® D1101 polymer (a linear SBS polymer)
[5]KRATON ® D1184 polymer (a branched S-B polymer)
[6]KRATON ® D1118 polymer (an S-B diblock polymer)
[7]KRATON ® FG1901X (described above)

I claim:

1. A self-adhesive water proofing product which comprises:
(a) a water proofing layer, and
(b) an adhesive layer comprising a mixture of from about 85% to about 99.5% of a bituminous component and from about 0.5% to about 15% of a block copolymer comprised of at least one vinyl aromatic hydrocarbon and at least one conjugated diene wherein the block copolymer contains at least 0.2% of at least one functional group selected from the group consisting of carboxylic and acid or anhydride groups or derivatives thereof including salts, esters, imides, amides and acid chlorides.

2. The product of claim 1 wherein the mixture comprises from about 1% to about 12% of the block copolymer.

3. The self-adhesive product of claim 1 wherein the water proofing layer is comprised of a reinforcing mat saturated and coated with polymer-modified bitumen.

4. The product of claim 3 wherein the reinforcing mat is a fibrous mat.

5. The self-adhesive product of claim 1 wherein the water proofing layer is comprised of a reinforcing fibrous mat saturated and coated with bituminous compositions topped with a granular surfacing material and the product is formed into shingles.

6. The self-adhesive product of claim 1 wherein the water proofing layer is comprised of a polymer modified bitumen sheet.

7. The product of claim 6 wherein the sheet includes a reinforcing fibrous mat and a plastic coating.

8. The product of claim 1 wherein the water proofing layer is comprised of polymeric rubber sheet.

9. The product of claim 1 wherein the waterproofing layer is comprised of a reinforcing not saturated with a bituminous composition.

10. A self-adhesive water proofing product which comprises:
(a) a water proofing layer, and
(b) an adhesive layer comprising a mixture of from about 85% to about 99.5% of a bituminous component and from about 0.5% to about 15% of a block copolymer having a residual unsaturation content in the diene block of less than about 20% and comprised of at least one vinyl aromatic hydrocarbon and at least one conjugated diene wherein the block copolymer contains at least 0.2% of at least one functional group selected from the group consisting of carboxylic and acid or anhydride groups or derivatives thereof including salts, esters, imides, amides and acid chlorides.

* * * * *